United States Patent
Wheatley et al.

(10) Patent No.: US 9,917,471 B2
(45) Date of Patent: Mar. 13, 2018

(54) SYSTEM AND METHOD FOR RECONFIGURING A SOLAR PANEL FOR STORAGE AND TRANSPORT

(71) Applicant: ENVISION SOLAR INTERNATIONAL, INC., San Diego, CA (US)

(72) Inventors: Desmond Wheatley, Rancho Santa Fe, CA (US); Patrick Senatore, San Diego, CA (US)

(73) Assignee: ENVISION SOLAR INTERNATIONAL, INC., San Diego, CA (US)

( * ) Notice: Subject to any disclaimer, the term of this patent is extended or adjusted under 35 U.S.C. 154(b) by 86 days.

(21) Appl. No.: 14/939,949

(22) Filed: Nov. 12, 2015

(65) Prior Publication Data

US 2016/0141913 A1    May 19, 2016

Related U.S. Application Data

(63) Continuation-in-part of application No. 13/572,540, filed on Aug. 10, 2012, now Pat. No. 9,209,648.

(51) Int. Cl.
   *H02J 7/00* (2006.01)
   *H01M 10/44* (2006.01)
   *H01M 10/46* (2006.01)
   *H02J 7/35* (2006.01)

(52) U.S. Cl.
   CPC ............ *H02J 7/355* (2013.01); *H02J 7/0044* (2013.01); *H02J 7/35* (2013.01); *H02J 7/0042* (2013.01); *Y02E 10/566* (2013.01); *Y10T 29/49117* (2015.01)

(58) Field of Classification Search
   CPC ... Y02T 90/14; Y02T 10/7088; Y02T 90/127; Y02T 10/90; B60L 2230/22; B60L 11/1824; B60L 2240/72; B60L 11/1838; B60L 11/1818; H02J 7/35; H02J 7/0027; H02J 3/383
   USPC .................................................. 320/101, 109
   See application file for complete search history.

(56) References Cited

U.S. PATENT DOCUMENTS

| | | | |
|---|---|---|---|
| 5,315,227 A | 5/1994 | Pierson et al. | |
| 6,972,689 B1* | 12/2005 | Morgan | G09F 21/04 340/815.4 |
| 2009/0050194 A1 | 2/2009 | Noble et al. | |
| 2011/0055037 A1 | 3/2011 | Hayashigawa et al. | |
| 2013/0285595 A1* | 10/2013 | Eaton, Jr. | H01L 31/042 320/101 |

(Continued)

FOREIGN PATENT DOCUMENTS

| WO | 2011142683 A1 | 11/2011 |
|---|---|---|
| WO | 2012090191 A1 | 7/2012 |

*Primary Examiner* — Nghia Doan
(74) *Attorney, Agent, or Firm* — Nydegger & Associates

(57) ABSTRACT

A mobile solar array is provided which can be reconfigured between an operational (i.e. flat) configuration, and a retracted (i.e. folded) configuration. This is a two-step process. First, the structure that supports the solar array in its operation configuration on a docking pad is collapsed. This lowers the solar array toward the docking pad. Next, the solar array, which includes three sections of photovoltaic modules is folded lengthwise. Specifically, side sections of the solar array are folded out-of-plane from the center section. This places the solar array in its retracted configuration.

12 Claims, 6 Drawing Sheets

(56) References Cited

U.S. PATENT DOCUMENTS

2014/0020731 A1* 1/2014 Levi .......................... F24J 1/00
136/245

* cited by examiner

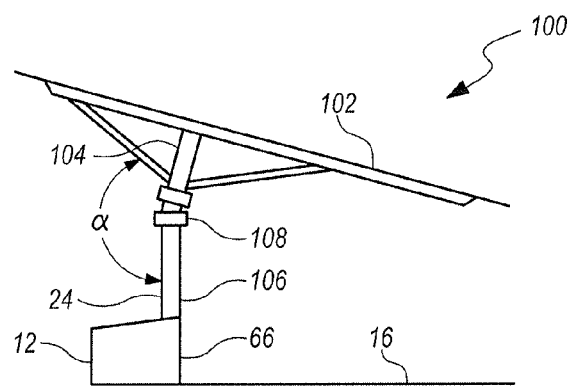
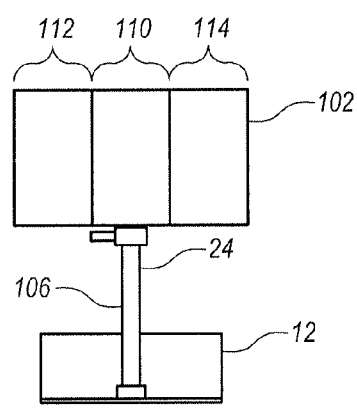
FIG. 6A        FIG. 6B
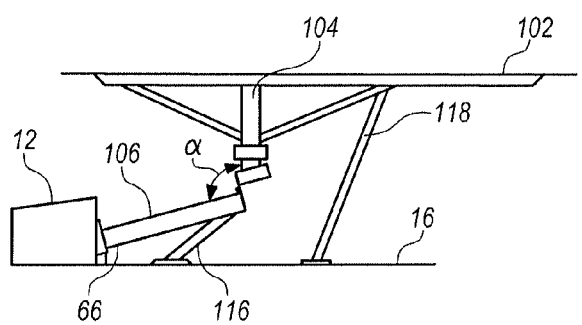
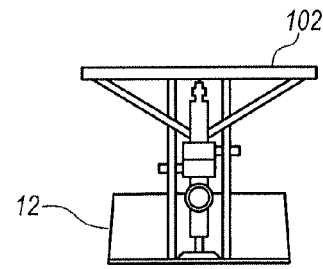
FIG. 7A        FIG. 7B

SYSTEM AND METHOD FOR RECONFIGURING A SOLAR PANEL FOR STORAGE AND TRANSPORT

This application is a continuation-in-part of application Ser. No. 13/572,540 filed Aug. 10, 2012, which is currently pending. The contents of application Ser. No. 13/572,540 are incorporated herein by reference.

FIELD OF THE INVENTION

The present invention pertains generally to electric charging systems for vehicles and devices. More particularly, the present invention pertains to systems and methods for charging electric vehicles using solar energy. The present invention is particularly, but not exclusively, useful as a portable, self-contained charging system for efficiently storing energy from solar arrays and using the stored energy to charge the batteries of an electric vehicle.

BACKGROUND OF THE INVENTION

Electric vehicles (EV), which can include all-electric vehicles and hybrids such as gas/electric vehicles, are growing in popularity among consumers. These vehicles offer an environmentally friendly alternative to vehicles powered exclusively by petroleum products. In particular, EVs have lower emissions of smog precursor gases, and they emit little to no greenhouse gases which have been linked to 'global warming'. In addition, as the cost of petroleum products has increased, the use of electric vehicles has become more economically beneficial.

Modernly, nearly all EVs include one or more on-board batteries for storing the electrical energy that is necessary to drive one or more electric motors and produce vehicle locomotion. One technique for recharging the on-board batteries includes connecting the vehicle to a permanently installed recharging station which receives its power from the electrical grid. For example, most EV operators have a charging station at the location where the car is usually stored, such as the operator's home or business. Unfortunately, access to additional recharge stations is somewhat limited at the present time in most areas. Although the range that an EV is able to travel before its battery must be recharged has improved in recent years, EVs still require a recharge during trips of moderate to long duration.

As electric vehicles become more common, for many EV operators, their electric vehicle may be their only vehicle. As such, many of these EV operators will desire to use their electric vehicle for all of their transportation needs including relatively long trips such as vacations, etc. To increase the useful range of the electric vehicle, operators will need to access charging stations at locations other than their primary vehicle storage sites. In some cases, there may be a need to provide a charging station on a temporary basis, for example, to provide coverage at a particular event. Alternatively, it may be desirable to provide a temporary charging station at a remote location while a more permanent charging station is being installed. In some instances, the temporary location requiring a charging station may not have ready access to the electrical grid. In other instances, the cost of providing a permanently installed charging station may be prohibitive or the lead-time associated with a permanent installation may be unsatisfactory.

In light of the above, it is an object of the present invention to provide a system for effectively and efficiently charging electric vehicles that can be flexibly moved to a variety of different locations where EV charging is needed. Another object of the present invention is to provide a system and method for quickly establishing an EV charging station at a location without requiring access to power from the electrical grid. Yet another object of the present invention is to provide a portable, self-contained system that is capable of providing renewable energy from solar arrays to charge an EV. Still another object of the present invention is to provide a system and method for reconfiguring a solar array into a retracted (stowed) configuration to facilitate transport of the array and to minimize adverse wind effects. An additional object of the present invention is to provide a self-contained renewable battery charger that is easy to use, is relatively simple to manufacture, and is comparatively cost effective.

SUMMARY OF THE INVENTION

In accordance with the present invention, a portable unit for charging a battery of an electric vehicle includes a moveable docking pad. For the portable unit, the docking pad includes a generally flat, horizontal base and is formed with a compartment for holding at least one storage battery and electronics. The portable unit also includes a column having a first end that is mounted onto the docking pad and a second end. Structurally, the column is oriented to extend upwardly from the docking pad to the second column end. There, at the second end of the column, a solar array is affixed to the column.

In a first embodiment of the present invention, the solar array is configured to produce a direct current (DC) output. For this embodiment, the current from the solar array is fed to the storage battery using charge management electronics. The battery, in turn, is connected to an EV charge station which produces a charging current to charge an external battery, such as the battery of an electric vehicle. An inverter can also be provided in the portable unit to generate alternating current (AC) from the DC battery output. The AC power from the inverter can be fed to the EV charge station and/or other AC loads in the portable unit such as lights, 120 VAC outlets, USB outlets, etc.

In another embodiment of the present invention, the solar array is configured to produce an AC output. For example, each photovoltaic module in the solar array can include a micro-inverter. For this embodiment, the combined current from the photovoltaic modules is converted to DC at an inverter/charger and fed to the storage battery. In addition, AC power from the solar array can be fed to an EV charge station through the inverter/charger. Finally, the inverter/charger can convert DC power from the battery storage to AC power for the EV charge station. The storage battery can also connect directly to the EV charge station. With this arrangement, the EV charge station can produce a charging current for the EV battery from the AC solar array power which is supplemented with power from the storage battery.

Also for the present invention, a tracking mechanism can be integrated into the column for moving the solar array to adjust the solar array orientation and maximize the incidence of sunlight on the photovoltaic modules. More specifically, the tracking mechanism can be positioned to interconnect a stationary portion of the column with the solar array. With this arrangement, the tracking mechanism can be used to selectively move the solar array relative to the stationary docking pad. In some cases, the solar array movements can be in accordance with a predetermined cycle that is developed based on the position and movements of the sun.

To assist in transporting the portable unit, a pivot mechanism can be provided between the column and docking pad to selectively pivot the solar array between a deployed configuration and a stowed configuration. In the deployed configuration, the solar array extends from the column to a free end and overlays the base. In the deployed configuration, the solar array and docking pad are arranged to provide ballast to the portable unit to prevent tipping in adverse weather conditions. The ballast against tipping is further increased by the weight and arrangement of the storage batteries in the docking pad compartment. In the stowed configuration, the solar array is folded about the pivot point such that the free end of the solar array is adjacent to the docking pad. Once adjacent to the docking pad, the free end can be attached to the docking pad to secure the solar array for transport.

In a particular arrangement of the portable EV battery charging unit, the docking pad is shaped substantially as a right rectangle with long sides and shorter ends. In some cases, the docking pad can be formed with wheel blocks to stabilize the vehicle on the docking pad. To provide for an alignment of the vehicle on the docking pad, a portion of the docking pad can be formed to extend upwardly from the docking pad base and is centered on the docking pad base.

In another aspect of the present invention, a system and method are disclosed for stowing a mobile solar array. As envisioned for the present invention, stowing may be done in order to provide a compact unit for transport of the mobile solar array, and to provide a less aerodynamic presentation thereof to minimize adverse wind effects. To do this, the solar array is to be reconfigured from its normal operational configuration, and into a retracted (stowed) configuration. As disclosed below, this reconfiguration is essentially a two-step process.

With the above purposes in mind, the support column includes an upper column that is connected with the solar array, and it has a lower column that is connected with a docking pad. In the normal operational configuration for the solar array, the upper column and the lower column are interconnected with each other to establish a common axis for mutually supporting the solar array above the docking pad.

For the first step for a reconfiguration of the mobile solar array, the support column is collapsed into an intermediate configuration by lowering the solar array from its normal operational configuration. In detail, this step is accomplished by engaging a hydraulic ram between the lower column and the docking pad. Also, in preparation for this step in the reconfiguration process, the normally fixed connection between the upper column and the lower column is converted into a hinged connection. Activation of the hydraulic ram then causes the lower column to rotate on the docking pad from a vertical orientation into a substantially horizontal orientation. Simultaneously, the upper column counter-rotates relative to the lower column. As the upper column does so, it remains in a substantially vertical orientation. At this point the solar array is substantially horizontal and the entire solar array mechanism is in the intermediate configuration.

In the second step of the reconfiguration process, the solar array itself is reconfigured. In this step, the structure of the solar array is an important consideration. Specifically, in accordance with this embodiment of the present invention, the solar array will include three side-by-side sections; i.e. one center section and two side sections. Preferably, all of the sections will have a same length L and a same width W. Further, the two side sections will straddle the center section. Also, the lengths of all three sections will be mutually parallel, and the two side sections will be respectively hinged to the center section. With this structure, the solar array can be transformed from its intermediate configuration and into its retracted (stowed) configuration merely by rotating the side sections out-of-plane from the center section. After this rotation, the side sections are in an orientation where they are essentially perpendicular to the plane of the center section.

It is to be appreciated that various support braces and trusses can be employed to stabilize the solar array during a reconfiguration process. Moreover, it is to be appreciated that the reconfiguration process is reversible. Thus, reconfiguration can proceed either from the normal operational configuration to the retracted (stowed) configuration as disclosed above, or it can proceed from the retracted configuration and back into the normal operational configuration.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 6A is a side view of a solar array in its operational configuration;

FIG. 6B is a front elevation view of the solar array as shown in FIG. 6A;

FIG. 7A is a side view of the solar array wherein the solar array has been lowered to an intermediate configuration;

FIG. 7B is a front elevation view of the solar array as shown in FIG. 7A;

DESCRIPTION OF THE PREFERRED EMBODIMENTS

Figure 1:
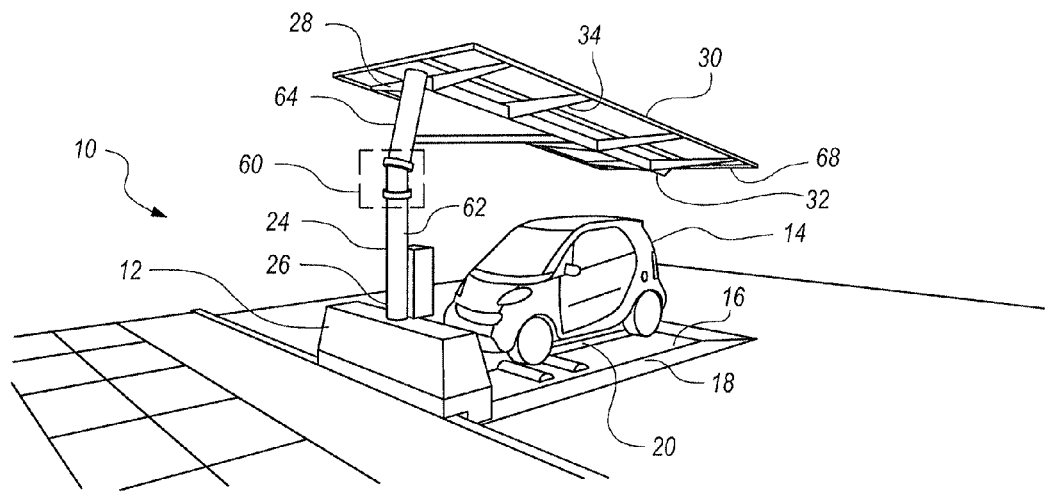
FIG. 1 is a front perspective view of a self-contained renewable battery charger in an operational environment.

Referring initially to FIG. 1, a system in accordance with the present invention is shown and is generally designated 10. As shown, the system 10 includes a portable unit 12 for charging an electric vehicle 14. As described herein, the portable unit 12 can be transported, after assembly, to a location such as the parking lot shown, where it can operate to charge an electric vehicle 14 without necessarily being connected to the electrical grid (not shown) or another source of electrical power.

Figure 2:
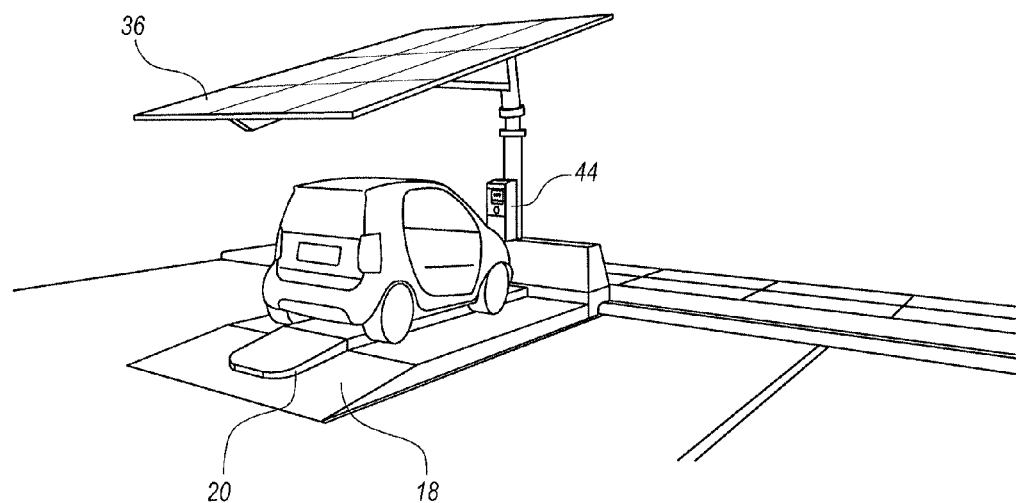
FIG. 2 is rear perspective view of the self-contained renewable battery charger shown in FIG. 1.
Figure 3:
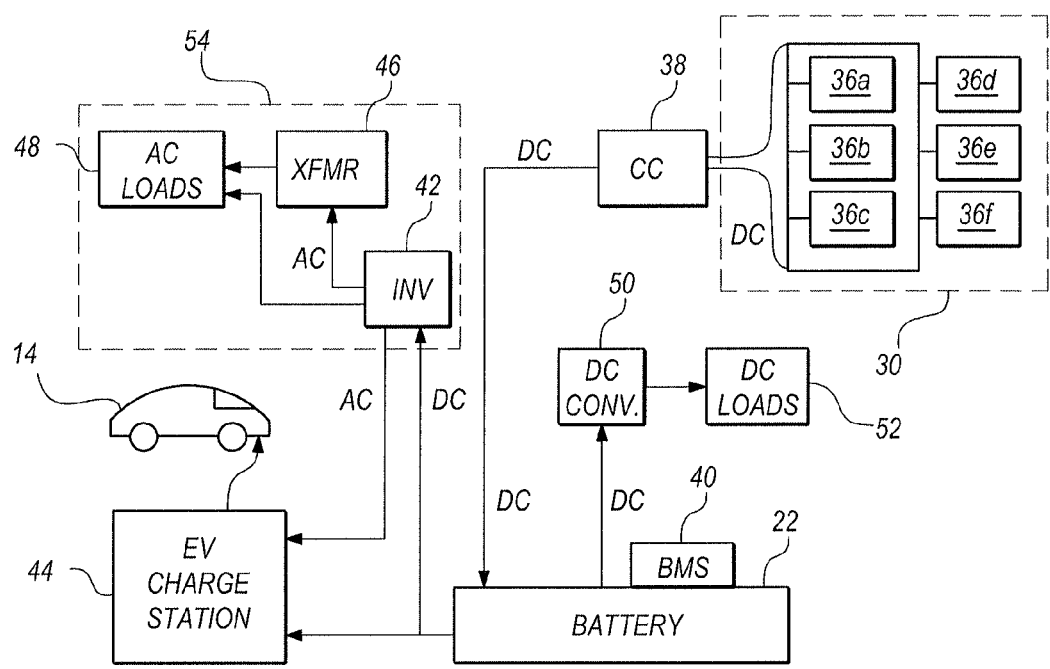
FIG. 3 is a schematic illustration showing an arrangement of electrical components for use in a self-contained renewable battery charger in which the solar array provides a DC output.

Cross-referencing FIGS. 1 and 2, it can be seen that the portable unit 12 includes a moveable docking pad 16 having a base 18 and a compartment 20 for holding at least one storage battery 22 and electronics (see FIG. 3). It is to be appreciated that the term 'battery' as used herein includes a battery bank having one or more batteries and/or battery cells that are operatively connected together. As shown, the base 18 of the docking pad 16 may be of suitable construction to support the weight of a vehicle 14 and formed with bumps to help hold the vehicle 14 on the base 18. Typically, as shown, the base 18 can include a generally flat, horizontal portion and a ramp to allow the vehicle 14 to access and park on the horizontal portion. It can further be seen that the portable unit 12 includes a column 24 having a first end 26 that is mounted onto the docking pad 16 and a second column end 28. As shown, the column 24 is oriented to extend upwardly, and in some cases vertically, from the docking pad 16.

Continuing with reference to FIGS. 1 and 2, it can be seen that a solar array 30 is affixed to the second end 28 of the column 24. For the arrangement shown, a structural canopy having a beam 32 and cross members 34 is attached to the column 24 to support a plurality of photovoltaic modules 36 (best seen in FIG. 2) that are arranged in the array 30. For the present invention, the photovoltaic modules 36 can include any type of photovoltaic cell known in the pertinent art.

FIG. 3 shows an embodiment of the present invention in which the solar array 30 is configured to produce a direct current (DC) output. As shown, an exemplary string(s) of photovoltaic modules 36 are electrically connected in parallel to produce an electrical output that is fed to a Charge Controller 38 which includes a Maximum Power Point Tracker. The CC 38 functions as a DC to DC converter that provides the most efficient power draw from solar array 30 using maximum power point tracking logic while managing DC battery charging. The output of the CC 38 is fed to the storage battery 22 using Battery Management System (BMS) 40. The battery 22 is sized with a capacity to store enough energy for EV charging, e.g. level 1 (110V) or level 2 (220V) EV charging, and to provide continuous system functionality. The BMS 40 ensures correct battery charging, discharging, balancing, and may be included or excluded depending on battery chemistry. Inverter 42 receives and converts a DC battery output to alternating current (AC), which in turn, is directed to an electric vehicle charging station 44 (see also FIG. 2). In addition, as shown in FIG. 3, auxiliary AC loads 48, which can include, for example, lights and 120V AC and USB outlets, can be powered from the inverter 42 or through an optional transformer 46.

As shown in FIG. 3, the Electric Vehicle Charging Station 44 receives DC power from the battery 22 and can also receive AC power from the inverter 42. Typically, the components are sized to allow the Electric Vehicle Charging Station 44 to provide Level 2 EV charging. In level 2 EV charging, AC energy is provided to the on-board charger of the vehicle 14. The AC energy is in the range of 208-240 volts, single phase, with a maximum current of 32 amps (continuous) and a branch circuit breaker rated at 40 amps.

FIG. 3 also shows that one or more DC/DC converters 50 can be provided to produce a constant DC voltage from a battery 22 output that is suitable for auxiliary DC loads 52. These DC loads can include, for example, motors, controllers, network hardware, and USB outlets. In addition to the components shown in FIG. 3, it is to be appreciated that one or more breakers and/or relays (not shown) may be included for proper system control and safety.

For some applications, an all DC arrangement may be used. For this arrangement, the components of FIG. 3 can be used without the AC components (box 54). For this arrangement, the vehicle charging station 44 receives DC power from the battery 22 and provides DC energy to an on-board charger of the vehicle 14. In some cases, the all-DC system may be more energy efficient because DC to AC conversion losses are eliminated.

Figure 4:
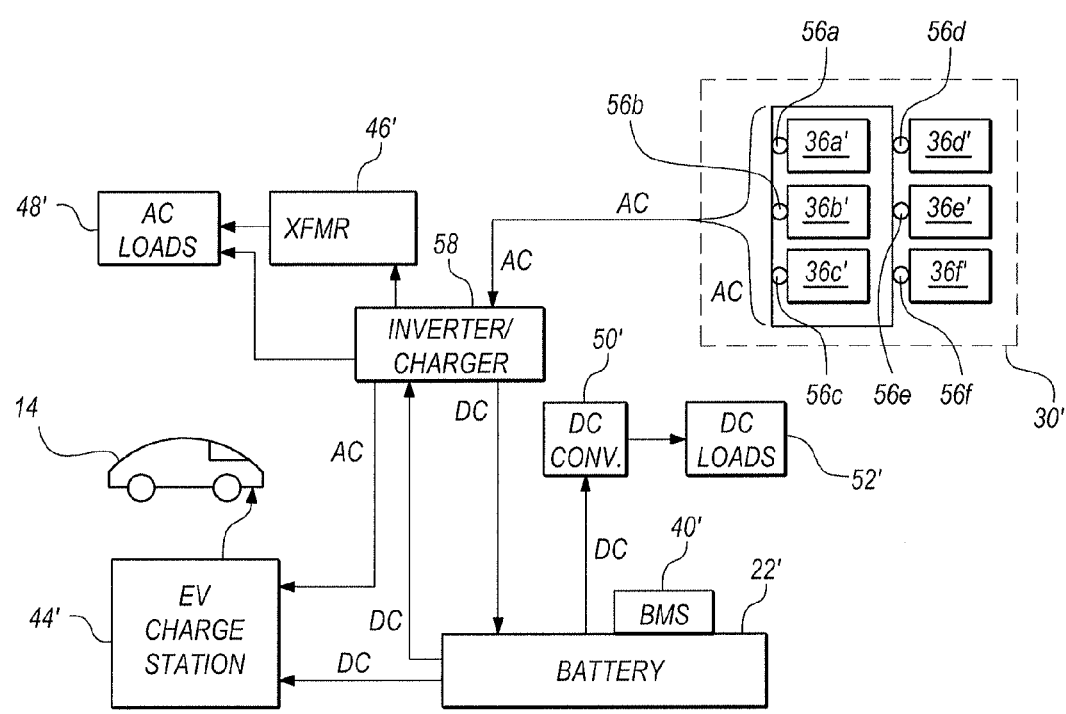
FIG. 4 is a schematic illustration showing a second arrangement of electrical components for use in a self-contained renewable battery charger in which the solar array provides a AC output.

FIG. 4 shows another embodiment of the present invention in which the solar array 30' is configured to produce an AC output. As shown, each photovoltaic module 36a'-36i' in the solar array 30' includes a respective micro-inverter 56a-i. For the embodiment shown in FIG. 4, each micro-inverter contains maximum power point tracking logic to ensure that the most efficient power draw is obtained from solar array 30'. As shown, strings of photovoltaic modules 36 are electrically connected in parallel to produce an electrical output that is fed to the inverter/charger 58. In an optional embodiment, a charge controller as described above with reference to FIG. 3 can be connected to the output of the solar array 30'. Alternatively, the solar array 30' can feed a string inverter (not shown) replacing the micro-inverters 56a-f shown in FIG. 4.

Continuing with FIG. 4, it can be seen that AC from the solar array 30' can be converted to DC at an inverter/charger 58 and fed to the storage battery 22' using a battery management system 40' (as described above). In addition, the inverter/charger 58 can tunnel AC power from the solar array 30' to the EV charge station 44' and/or convert DC from the battery 22' to AC and feed the AC to the charge station 44'.

For the FIG. 4 embodiment, the battery 22' is sized with a capacity to store enough energy for EV charging, e.g. level 1 (110V) or level 2 (220V) EV charging, and to provide continuous system functionality. In addition, as shown in FIG. 4, auxiliary AC loads 48', which can include, for example, motors, controllers, network hardware, USB outlets, lights and 120V AC and USB outlets, can also be powered from the inverter/charger 58 or through an optional transformer 46'. Also shown, the Electric Vehicle Charging Station 44' may receive DC power from the battery 22'.

FIG. 4 also shows that one or more DC/DC converters 50' can be provided to produce a constant DC voltage from a battery 22' output that is suitable for auxiliary DC loads 52'. These DC loads can include, for example, motors, controllers, network hardware, and USB outlets. In addition to the components shown in FIG. 4, it is to be appreciated that one or more breakers and/or relays (not shown) may be included for proper system control and safety.

Referring back to FIG. 1, it can be seen that the portable unit 12 can also include a tracking mechanism 60 that is integrated into the column 24 for moving the solar array 30. This movement can be performed to adjust to the orientation of the solar array 30 to maximize the incidence of sunlight on the solar array 30 (i.e. point the solar array 30 toward the sun). This adjustment can be made initially during setup and installation and/or during operation. As shown, the tracking mechanism 60 can be positioned to interconnect a stationary portion 62 of the column 24 with a moveable portion 64 of the column 24, which in turn, is attached to the solar array 30. For example, a suitable tracking mechanism for use in the present invention is disclosed and claimed in co-owned U.S. patent application Ser. No. 13/099,152, titled, "Device for Continuously Orienting a Solar Panel", filed May 2, 2011 for inventors Robert L. Noble and Desmond Wheatley, the entire contents of which are hereby incorporated by reference herein. With the arrangement shown in FIG. 1, the tracking mechanism 60 can be used to selectively move the solar array 30 relative to the stationary docking pad 16. In some cases, the movements of the solar array 30 can be in accordance with a predetermined cycle that is developed based on the position and movements of the sun.

Figure 5:
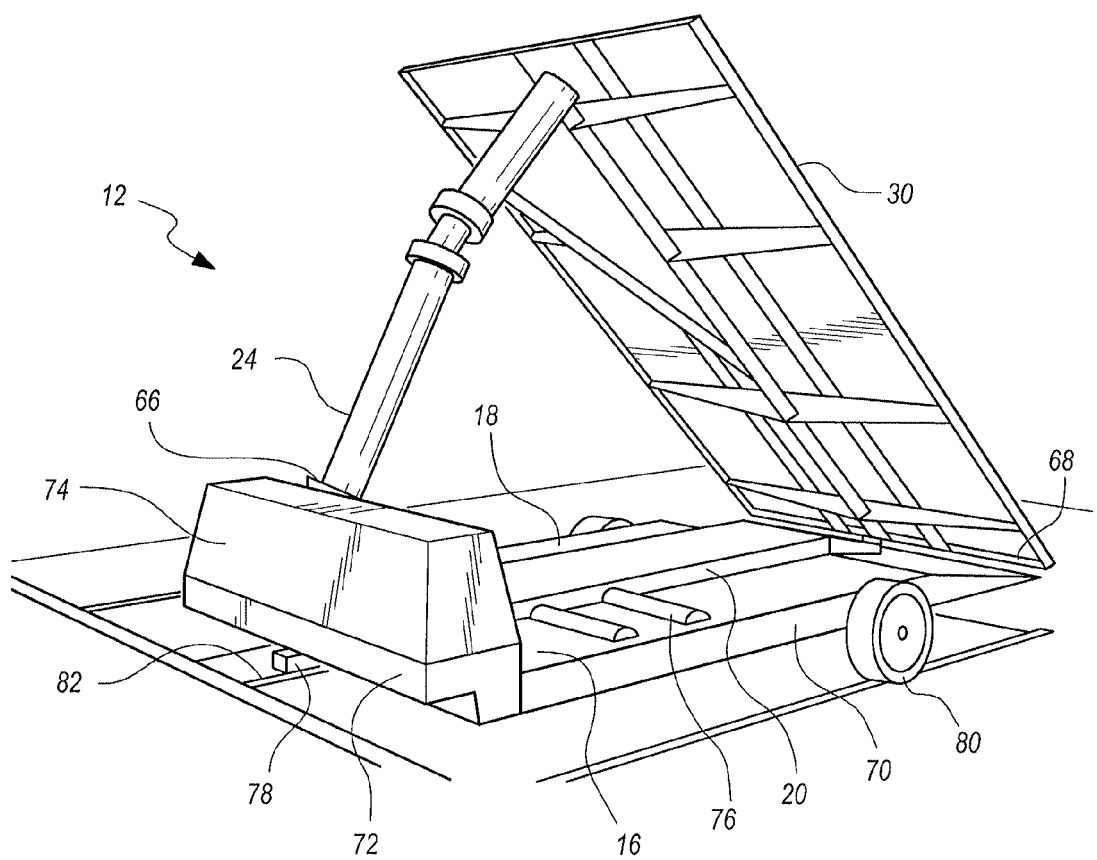
FIG. 5 is a perspective view of a self-contained renewable battery charger loaded on a carriage for transport with the solar array positioned in a stowed configuration.

FIG. 5 shows that the portable unit 12 can include a pivot mechanism 66 located between the column 24 and docking pad 16. Cross-referencing FIGS. 1 and 5, it can be seen that the pivot mechanism 66 allows the solar array 30 and column 24 to be pivoted between a deployed configuration (FIG. 1) and a stowed configuration (FIG. 5). In the deployed configuration shown in FIG. 1, the solar array 30 extends from the column 24 to a free end 68 and overlays the docking pad 16. More specifically, the solar array 30 is positioned above the docking pad 16. Regardless whether the solar array 30 is in the deployed configuration (FIG. 1), or in the stowed configuration (FIG. 5), the docking pad 16 provides ballast (i.e. balance) to the portable unit 12 to prevent tipping. This ballast against tipping is further increased due to the weight of the storage batteries 22 (labeled in FIG. 3) that are positioned in the compartment 20 and distanced from the pivot mechanism 66 and column 24. Additionally, as will be appreciated by the skilled artisan, articles used as concrete ingots can be selectively used for ballast, and can subsequently be removed to provide for placement of additional batteries, if required. In the stowed configuration (FIG. 5), the solar array 30 is folded about the pivot mechanism 66 such that the free end 68 opposite the pivot mechanism 66 is adjacent to the docking pad 16. Once adjacent to the docking pad 16, the free end 68 can be attached to the docking pad 16 to secure the solar array 30 for transport.

Continuing with FIG. 5, it can be seen that the docking pad 16 can be shaped substantially as a right rectangle with long sides 70 and shorter ends 68, 72 and includes a housing 74 for holding some or all of the electrical components shown in FIG. 3 or FIG. 4. As shown, the docking pad 16 is sized to accommodate an electric vehicle 14 (see FIG. 1) and can be formed with wheel blocks 76 to stabilize the vehicle 14 on the docking pad 16. Also shown, the docking pad compartment 20 can be formed to extend upwardly from the docking pad base 18. In addition, the raised compartment 20 can be centered on the docking pad 16 between the sides 70 to provide for an alignment of the vehicle 14 (see FIG. 1) on the docking pad 16 to reduce the risk of a vehicle 14 accidentally driving off the side of the docking pad 16.

FIG. 5 further illustrates that the portable unit 12 can be transported on a carriage 78 having wheels 80 and a ball-hitch receiver 82 for attachment to a tow vehicle such as a truck (not shown). For example, the portable unit 12 can be lifted from the carriage 78 using jacks, e.g. four jacks (not shown). Once lifted, the carriage can be rolled out from underneath the portable unit 12 and the portable unit 12 can be lowered into an operational position using the jacks. Once properly positioned, the pivot mechanism 66 can be used to deploy the solar array 30. To transport the portable unit 12 from a site, the portable unit 12 can be jacked up, the carriage 78 rolled underneath and the jacks used to lower the portable unit 12 onto the carriage 78. Alternatively, a crane (not shown) or forklift (not shown) may be used to load or unload the portable unit 12 onto/from a carriage 78 or truck (not shown).

As envisioned for the system 10, the portable unit 12 can be remotely monitored in any manner well known in the pertinent art. Stated differently, the health, performance and environmental condition pertinent to the operation of system 10 can be monitored on a continuous basis.

Referring now to FIG. 6A, an alternate embodiment for a reconfigurable system is shown and is generally designated 100. As shown in FIG. 6A, the system 100 includes a solar array 102 that is mounted on a support column 24 which extends the solar array 102 over the docking pad 16, substantially as disclosed above. For the system 100, however, the support column 24 and the solar array 102 are each reconfigurable during steps of a process which successively change the system 100 from a normal operational configuration, to an intermediate configuration, and to a retracted configuration, and vice versa. As shown in both FIG. 6A and FIG. 6B, the system 100 is in its normal operational configuration.

In FIG. 6A, it is indicated that the support column 24 actually includes both an upper column 104 and a lower column 106. As shown, the solar array 102 is fixedly attached to the upper column 104. A hinge connection 108, however, is provided between the upper column 104 and the lower column 106. As intended for the present invention, the hinge connection 108 is used only when the system 100 is to be reconfigured out of its normal operational configuration. Otherwise, when the system 100 is in its normal operational configuration (i.e. FIGS. 6A and 6B) the upper column 104 and the lower column 106 of the support column 24 are fixed relative to each other.

With specific reference to FIG. 6B, it is to be appreciated that the solar array 102 for the system 100 includes three side-by-side sections. These are, a center section 110, a side section 112 and a side section 114. In their combination, the side sections 112 and 114 straddle the center section 110. Further, in the normal operational configuration of the system 100, the sections 110, 112 and 114 are coplanar. Moreover, as disclosed earlier herein, the solar array 102 includes a plurality of photovoltaic cells which are operationally oriented to collect solar energy for commercial purposes.

In accordance with the present invention, a first step in the two-step process for reconfiguring the solar array 102 with the support column 24 involves a transition of the system 100 from its normal operational configuration (FIG. 6A) into an intermediate configuration (FIG. 7A). To perform this transition, the hinge connection 108 is established, and a hydraulic ram 116 is connected between the lower column 106 and the docking pad 16. Also, a support brace 118 can be engaged between the solar array 102 and the docking pad 16 (see FIG. 7A). At the start of this first step, an angle α between the upper column 104 and lower column 106 is established in a range between 180° and 220°.

Once the system 100 has been prepared for reconfiguration, an activation of the hydraulic ram 116 will then rotate the lower column 106 about the pivot mechanism 66. As this rotation is accomplished, the lower column 106 is reoriented from a substantially vertical orientation (FIG. 6A), and into a substantially horizontal orientation (FIG. 7A). Simultaneously, and in response to the combined actions of the hydraulic ram 116 and the support brace 118, the upper column 104 is counter-rotated relative to the lower column 106. During this counter-rotation, a substantially vertical orientation for the upper column 104 is maintained. Thus, the first step in the transition takes the system 100 from its normal operational configuration, shown in FIGS. 6A and 6B, into an intermediate configuration shown in FIGS. 7A and 7B.

As shown in FIG. 7A, for the intermediate configuration of the system 100 the angle α has changed and now assumes a value in the range between approximately 90° and 110°. Also, by cross-referencing FIG. 7A with FIG. 7B, it will be seen that the solar array 102 has been reoriented from being tilted in its normal operational configuration, to being substantially horizontal in the intermediate configuration for the system 100.

It is to be appreciated that although the system 100 may not be transportable when in its intermediate configuration (FIGS. 7A and 7B), it can still be operational. Specifically, system 100 in the intermediate configuration can remain operationally suitable for generating electricity in extraordinary circumstances, such as during high wind conditions (e.g. in a hurricane zone). With this capability, the present invention can be an excellent disaster preparedness tool whenever emergency power is required.

Figure 8:
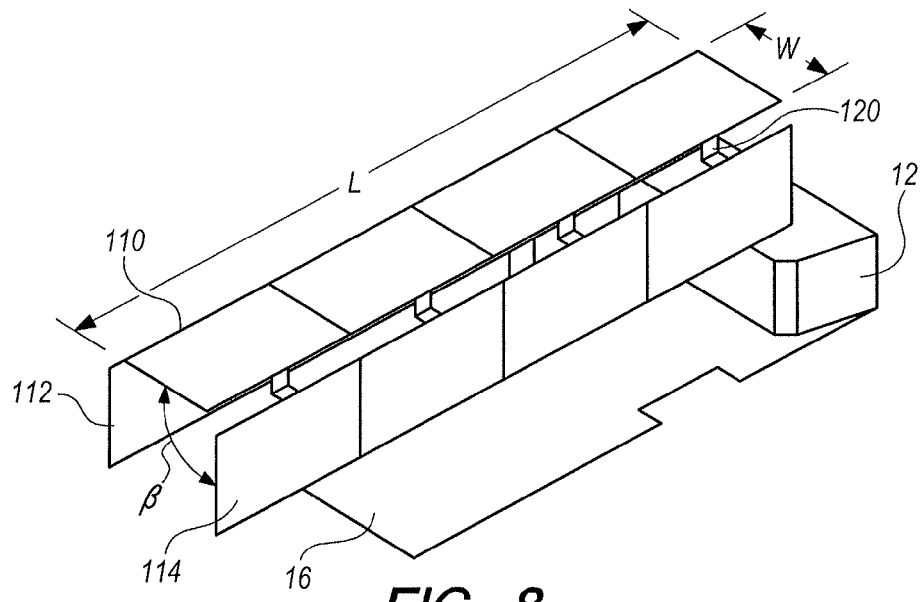
FIG. 8 is a perspective view of the solar array in its retracted (stowed) configuration.

The second step in the two-step process for reconfiguring the system 100 will be best appreciated by comparing FIG. 7A with FIG. 8. With this comparison it will be seen that a transition from the intermediate configuration for system 100 (FIG. 7A) into a retracted configuration (FIG. 8), is accomplished by folding the side sections 112 and 114 out-of-plane from the center section 110. This folding is made possible by a plurality of hinges 120 that interconnect the center section 110 with the respective side sections 112 and 114. The hinge 120 shown in FIG. 8 is exemplary. It is also seen in FIG. 8 that each of the sections 110, 112 and 114 have a length L (L≅22 ft.) and a width W (W≅4 ft.).

Figure 9A:
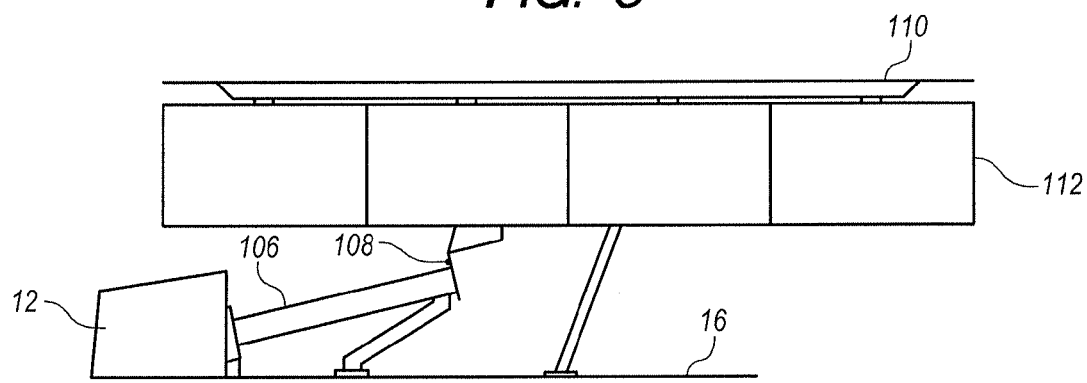
FIG. 9A is a side view of the solar array as shown in FIG. 8.
Figure 9B:
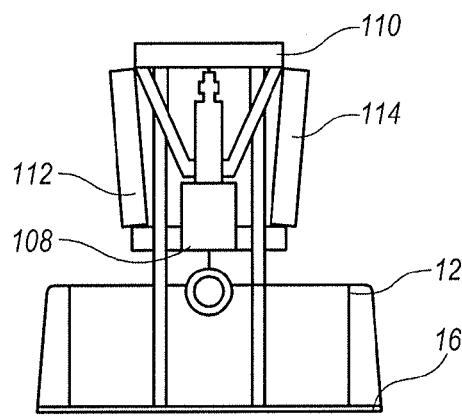
FIG. 9B is a front elevation view of the solar array as shown in FIG. 9A.

Further, as shown in FIG. 8 for the retracted configuration, the side sections 112 and 114 are folded to be substantially vertical to the plane of the center section 110. An angle β, shown in FIG. 8 between the center section 110 and the side section 114 is exemplary of the retracted configuration. FIGS. 9A and 9B for the retracted configuration provide perspective comparisons with corresponding views of the normal operational configuration (FIGS. 6A and 6B), and the intermediate configuration (FIGS. 7A and 7B). As intended for the present invention, and indicated above, the reconfiguration process can be reversed from the order disclosed above.

While the particular System and Method for Reconfiguring a Solar Panel for Storage and Transport as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for stowing a mobile solar array which comprises:
    a support column mounted on a docking pad to support the solar array, wherein the support column has an upper column and a lower column with a hinge connection therebetween;
    a hydraulic ram engaged to interconnect the lower column with the docking pad; and
    a means for activating the hydraulic ram to rotate the upper column relative to the lower column back and forth on the hinge connection in a rotation plane, to move the solar array between an operational configuration and a retracted configuration, wherein for the operational configuration the support column is extended and the solar array is flat for collecting solar radiation, and wherein for the retracted configuration the support column is collapsed to lower the solar array toward the docking pad and the solar array is folded to provide a compact unit for transport of the mobile solar array and to present the solar array as a less aerodynamic body to minimize adverse wind effects.

2. The system recited in claim 1 wherein the solar panel comprises:
    a rectangular shaped center section having a plurality of contiguous solar modules, wherein the center section has a length L and a width W; and
    a pair of rectangular-shaped side sections wherein each side section includes a plurality of contiguous solar modules and has a length L and a width W, wherein the side sections straddle the center section and each side section is connected by hinges with the center section, and further wherein the lengths L of the respective center section and side sections are mutually parallel.

3. The system recited in claim 2 wherein L≅22 ft. and W is ≅4 ft.

4. The system recited in claim 2 wherein each side section is rotated back and forth on its respective hinges with the center section through a respective angle ±β relative to the center section when the solar array is folded, and wherein β is greater than 90°.

5. The system recited in claim 1 wherein an angle α is defined between the lower column and the upper column in a rotation plane established by the hinge connection during a movement of the solar array between its operational configuration and its retracted configuration, and wherein the angle α is in a range between 180° and 220° when the solar array is in its operational configuration and the angle α is in a range between 90° and 110° when the solar array is in its retracted configuration.

6. The system recited in claim 1 wherein the hydraulic ram is disconnected from the support column and from the docking pad when the solar array is in its operational configuration.

7. The system recited in claim 1 further comprising a support brace, wherein the support brace is engaged to interconnect the solar array with the docking pad to stabilize the solar array in its retracted configuration.

8. The system recited in claim 1 further comprising a hydraulic power pack for energizing the hydraulic ram.

9. A method for stowing a mobile solar array, wherein the solar array includes a support column mounted on a docking pad to support the solar array, the method comprising the steps of:
    engaging a hydraulic ram to interconnect the support column with the docking pad, wherein the support column has an upper column and a lower column with a hinge connection between the upper and lower columns, and wherein the hydraulic ram is connected with the lower column;
    activating the hydraulic ram to rotate the upper column relative to the lower column back and forth on a hinge connection, to move the solar array between an operational configuration and a retracted configuration, wherein for the operational configuration the support column is extended and the solar Array is flat for collectin solar radiation and wherein for the retracted configuration the support column is collapsed to lower the solar array toward the docking pad; and
    folding the solar array to provide a compact unit for transport of the mobile solar array and to present the solar array as a less aerodynamic body to minimize adverse wind effects.

10. The method recited in claim 9 wherein the solar array includes a center section and a pair of side sections, wherein the side sections straddle the center section, and wherein the folding step is accomplished by the steps of;

rotating one side section back and forth on its respective hinges with the center section through an angle $+\beta$ relative to the center section; and rotating the other side section back and forth on its respective hinges with the center section through an angle $-\beta$, and wherein each angle $\beta$ is greater than 90°.

11. The method recited in claim 9 further comprising the step of disconnecting the hydraulic ram from the support column and from the docking pad when the solar array is in its operational configuration.

12. The method recited in claim 9 further comprising the step of engaging a support brace to interconnect the solar array with the docking pad to stabilize the solar array in its retracted configuration.

\* \* \* \* \*